United States Patent [19]

Yamada

[11] Patent Number: 5,511,214
[45] Date of Patent: Apr. 23, 1996

[54] ON-LINE PROCESSING SYSTEM AND OVERLOAD SUPPRESSING METHOD

[75] Inventor: Yutaka Yamada, Kawasaki, Japan

[73] Assignee: Fujitsu Limited, Kawasaki, Japan

[21] Appl. No.: 110,935

[22] Filed: Aug. 24, 1993

[30] Foreign Application Priority Data

Aug. 25, 1992 [JP] Japan .................................. 4-225377

[51] Int. Cl.⁶ .................................................. G06F 12/00
[52] U.S. Cl. .................... 395/800; 395/650; 364/DIG. 1; 364/238.9; 364/246.11
[58] Field of Search ..................... 395/250, 275, 395/600, 650, 800, 500, 872, 873, 876–877, 732, 725

[56] References Cited

U.S. PATENT DOCUMENTS

| | | | |
|---|---|---|---|
| 4,422,145 | 12/1983 | Sacco et al. | 395/650 |
| 4,965,719 | 10/1990 | Shoens et al. | 395/650 |
| 4,993,030 | 2/1991 | Krakauer et al. | 371/40.1 |
| 5,093,912 | 3/1992 | Dong et al. | 395/650 |
| 5,237,661 | 8/1993 | Kawamura et al. | 395/250 |
| 5,247,672 | 9/1993 | Mohan | 395/650 |
| 5,280,611 | 1/1994 | Mohan et al. | 395/600 |

FOREIGN PATENT DOCUMENTS

| | | |
|---|---|---|
| 58-019958 | 2/1983 | Japan . |
| 62-279433 | 12/1987 | Japan . |
| 2-211545 | 8/1990 | Japan . |
| 2-212962 | 8/1990 | Japan . |
| 4-170586 | 6/1992 | Japan . |

*Primary Examiner*—Mehmet Geckil
*Attorney, Agent, or Firm*—Staas & Halsey

[57] ABSTRACT

An on-line processing system is provided with a plurality of work processing parts for carrying out work processes based on application programs, a plurality of buffer pools having buffer regions, a buffer control part for allocating the buffer regions of the buffer pools for use by each of the work processing parts, a threshold value control part for detecting a dangerous state of the buffer regions when the buffer control part acquires the buffer regions from the buffer pools by comparing predetermined information related to an amount of buffer regions used and a predetermined threshold value, where the dangerous state indicates a possibility of a buffer overload due to lack of storage regions provided by the buffer regions, and a work supervision control part for automatically detecting a work processing part having a priority which is lower than a predetermined priority value out of the plurality of work processing parts, and for suppressing the detected work processing part, so that the overload of the buffer regions is avoided.

6 Claims, 3 Drawing Sheets

ON-LINE PROCESSING SYSTEM AND OVERLOAD SUPPRESSING METHOD

BACKGROUND OF THE INVENTION

The present invention generally relates to on-line processing systems and overload suppressing methods, and more particularly to an on-line processing system and an overload suppressing method for automatically suppressing an overload of a buffer which is used as a storage region for temporarily storing messages.

In computer systems, there are continuous demands to increase the processing speed. Hence, when transferring a message via a buffer in an on-line processing system, there are demands to stop the work with a low priority before a buffer overload occurs and causes the work with a high priority to slow down, so as to carry out the work process with the high priority without hindrance. It is possible to detect the lack of buffer region (or space) to a certain extent by use of an application program which is made by the user. However, there is no means of detecting the work with the low priority, and it would be very useful if it were possible for the system to automatically detect the work with the low priority, that is, the work which does not need to be carried out with a high priority.

Figure 1:
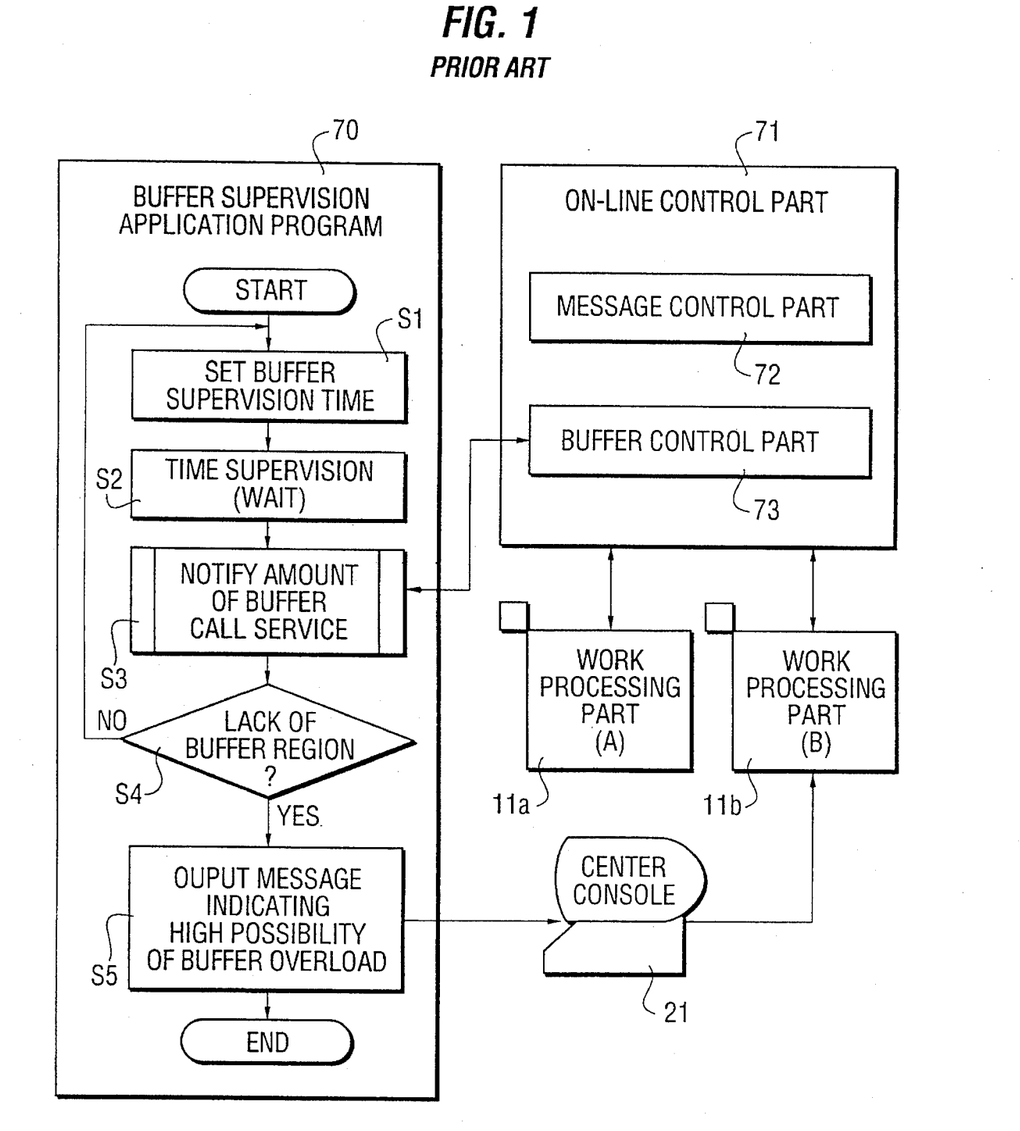
FIG. 1 is a diagram for explaining an example of a conventional on-line processing system.

FIG. 1 is a diagram for explaining an example of a conventional on-line processing system. In FIG. 1, work processing parts 11a and 11b carry out predetermined work processes by application programs. The work processing parts 11a and 11b are coupled to an on-line control part 71. This on-line control part 71 includes a message control part 72 for controlling transfer of messages to and from terminal equipment and the work processing parts 11a and 11b, and a buffer control part 73 for managing a buffer (not shown) which is used as a storage region for temporarily storing the messages. In other words, the buffer control part 73 acquires and releases the buffer. A center console 21 is coupled to tile work processing part 11b. A buffer supervising application program 70 is made by the user.

The buffer control part 73 of the on-line control part 71 has a plurality of buffer pools, and manages the correspondence between a buffer which is selected from the buffer pools and each work processing parts 11a and 11b. If a large number of buffers are simultaneously used and it becomes impossible to secure a sufficient buffer region for storing input/output messages or the like, an overload occurs and the service of the work processing parts 11a and 11b stops. In this case, it is desirable to continue the process of the work processing parts 11a and 11b having a high priority and to stop the process of the work processing parts 11a and 11b having a low priority.

For this reason, the user conventionally makes the buffer supervising application program 70 for detecting the lack of buffer region, and detects the insufficient buffer region by executing this buffer supervising application program 70. The overload is suppressed by urging the operator to input an instruction to stop the work which is using the extremely limited buffer region.

In other words, the following process is carried out by the buffer supervising application program 70.

A step S1 shown in FIG. 1 sets a predetermined buffer supervision time for periodically supervising the buffer, and makes a supervision request to an operating system for this predetermined buffer supervision time. A step S2 waits for a time lapse notification from the operating system. A step S3 calls a buffer region (or amount) notification service provided by the buffer control part 73 if the predetermined buffer supervision time elapses, so as to investigate the present amount of buffer region used. A step S4 decides whether or not the free or available buffer region is insufficient. If the free buffer region is sufficient and the decision result in the step S4 is NO, the process returns to the step S1 so as to similarly continue the time supervision.

On the other hand, if the free buffer region is insufficient and the decision result in the step S4 is YES, a step S5 outputs to the center console 21 a message which indicates that the free buffer region is extremely limited and that the possibility of buffer overload is high. The process ends after the step S5. Accordingly, if such a message indicating that the possibility of buffer overload is high is output from the center console 21, the operator stops the work processing part 11b, for example, which is regarded as having the low priority, so as to eliminate the possibility of buffer overload.

According to the conventional on-line processing system shown in FIG. 1, the buffer region is supervised for every predetermined time, and it is thus impossible to detect the lack of buffer region in real time. As a result, even if the operator stops the work with the low priority when the lack of buffer region is detected, it may be too late and the buffer allocation with respect to the work with the high priority may fail.

In other words, even if the buffer supervising application program 70 detects the lack of buffer region and the work with the low priority is stopped, the buffer region may not be released in time, and there was a problem in that the process of the work with the high priority may slow down due to an insufficient buffer region.

SUMMARY OF THE INVENTION

Accordingly, it is a general object of the present invention to provide a novel and useful on-line processing system and overload suppressing method, in which the problem described above is eliminated.

Another and more specific object of the present invention is to provide an on-line processing system comprising a plurality of work processing means for carrying out work processes based on application programs, a plurality of buffer pools having buffer regions, buffer control means, coupled to the work processing means and the buffer pools, for allocating the buffer regions of the buffer pools for use by each of the work processing parts, threshold value control means, coupled to the buffer control means, for detecting a dangerous state of the buffer regions when the buffer control means acquires the buffer regions from the buffer pools by comparing predetermined information related to an amount of buffer regions used and a predetermined threshold value, where the dangerous state indicates a possibility of a buffer overload due to lack of storage regions provided by the buffer regions, and work supervision control means, coupled to the buffer control means, for automatically detecting a work processing means having a priority which is lower than a predetermined priority value out of the plurality of work processing means, and for suppressing the detected work processing means, so that the overload of the buffer regions is avoided. According to the on-line processing system of the present invention, it is unnecessary for the user to make a buffer supervising application program. Further, it is possible to prevent the work or work process having a high priority from slowing down due to lack of buffer regions. As a result, it is possible to improve the performance of the on-line processing system and to reduce the operation load.

Still another object of the present invention is to provide an overload suppressing method adapted to an on-line processing system which comprises a plurality of work processing means for carrying out work processes based on application programs, a plurality of buffer pools having buffer regions, and buffer control means, coupled to the work processing means and the buffer pools, for allocating the buffer regions of the buffer pools for use by each of the work processing parts, where the overload suppressing method comprises tile steps of (a) detecting a dangerous state of the buffer regions when the buffer control means acquires the buffer regions from the buffer pools by comparing predetermined information related to an amount of buffer regions used and a predetermined threshold value, the dangerous state indicating a possibility of a buffer overload due to lack of storage regions provided by the buffer regions, and (b) automatically detecting a work processing means having a priority which is lower than a predetermined priority value out of the plurality of work processing means, and for suppressing the detected work processing means, so that the overload of the buffer regions is avoided. According to the overload suppressing method of the present invention, it is unnecessary for the user to make a buffer supervising application program. Further, it is possible to prevent the work or work process having a high priority from slowing down due to lack of buffer regions. As a result, it is possible to improve the performance of the on-line processing system and to reduce the operation load.

Other objects and further features of the present invention will be apparent from the following detailed description when read in conjunction with the accompanying drawings.

DESCRIPTION OF THE PREFERRED EMBODIMENTS

Figure 2:
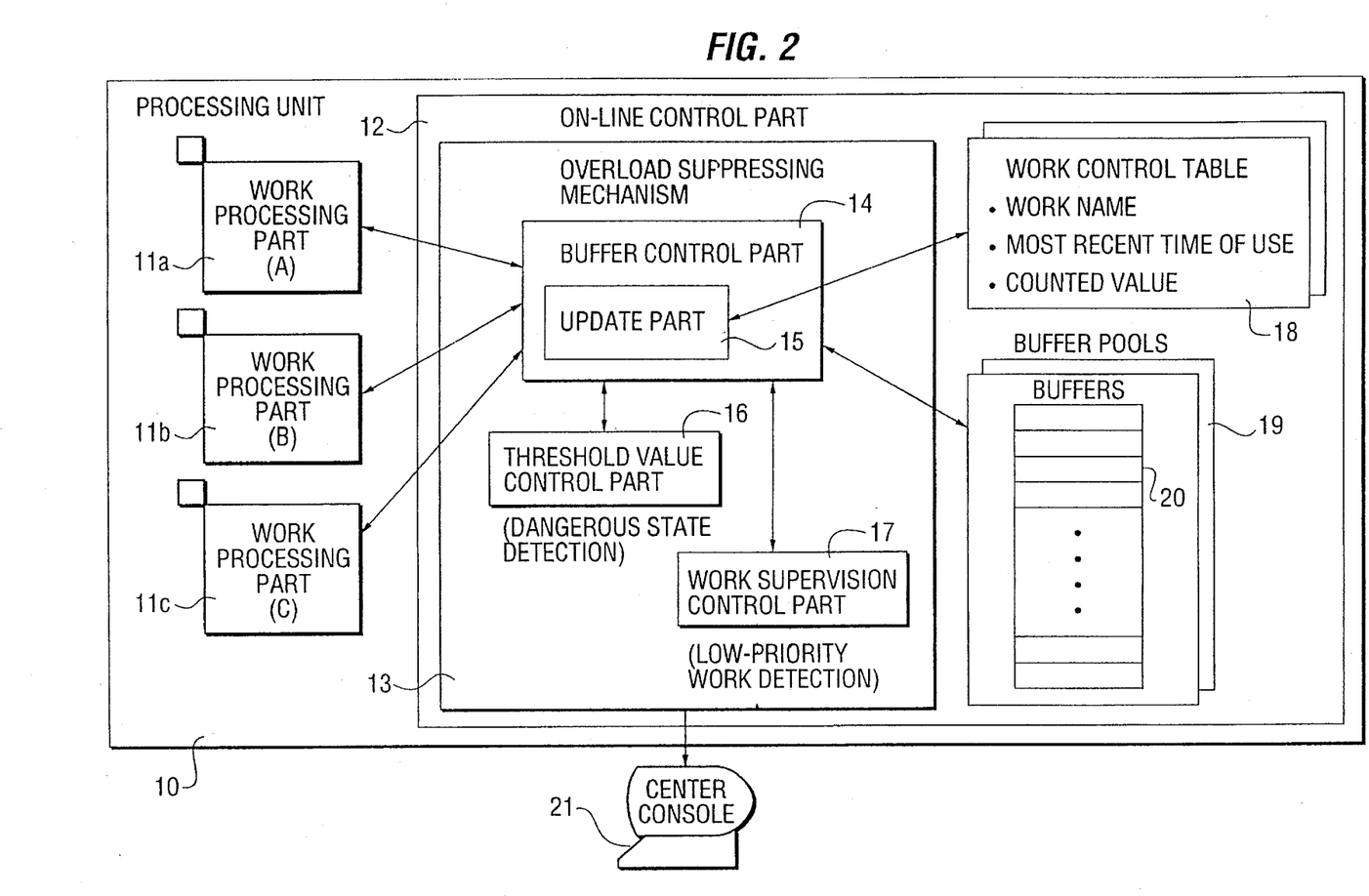
FIG. 2 is a system block diagram showing an embodiment of an on-line processing system according to the present invention.

FIG. 2 shows an embodiment of an on-line processing system according to the present invention, which employs an embodiment of an overload suppressing method according to the present invention. In FIG. 2, a processing unit 10 has a known hardware construction including a central processing unit (CPU), a memory and the like. More particularly, the processing unit 10 includes a plurality of work processing parts 11a, 11b and 11c which carry out predetermined work processes based on application programs, an on-line control part 12 which operates based on an on-line control program, and a center console 21. The on-line control part 13 includes an overload suppressing mechanism 13 which suppresses overload of buffers 20 and eliminates the lack of the buffer region, a work control table 18 which stores information related to work processes which use the buffers 20, and buffer pools 19 made up of a group of buffers or buffer regions 20 which are acquired and released.

The overload suppressing mechanism 13 includes a buffer control part 14, a threshold value control part 16, and a work supervision control part 17. The buffer control part 14 manages the buffers 20 which are used as storage regions for temporarily storing messages, and processes acquisition and release of the buffers 20. The threshold value control part 16 detects a dangerous state where the storage region provided by the buffers 20 may become insufficient, based on a predetermined threshold value. The work supervision control part 17 detects a work which has a low priority and may be stopped if the storage region provided by the buffers 20 becomes insufficient. The buffer control part 14 includes an update part 15 which updates a most recent time when each buffer 20 is used by the work and the counted value of an internal counter which counts the number of times each buffer 20 is used by the work, when acquiring the buffers 20.

The work control table 18 stores information related to each work which uses the buffers 20. Each buffer 20 within the buffer pool 19 is used as a storage region for temporarily storing messages or the like.

When the buffer control part 14 acquires the buffer 20 from the buffer pools 19, the threshold value control part 16 compares the rate or amount of buffers 20 used with the predetermined threshold value, so as to detect the dangerous state where the buffer overload may occur. The rate of the buffers 20 used is taken relative to the entire storage region of the buffers 20.

When the threshold value control part 16 detects the dangerous state of the buffers 20, the work supervision control part 17 automatically detects the work processing parts having the low priority out of the work processing parts 11a, 11b and 11c in response to notification of the dangerous state of the buffers 20 received from the threshold value control part 16. Based on the detected work processing part having the low priority, the work supervision control part 17 stops this work processing part having the low priority or prevents allocation of the buffers 20 with respect to this work processing part having the low priority.

In order to detect the work processing part having the low priority, the work control table 18 manages for each buffer pool 19 information related to the work name which identifies the work processing part which uses the buffers 20, information related to the most recent time when the buffers 20 are used by the work processing part, counter information related to the number of times the buffers 20 are used by the work processing part and the like.

The update part 15 of the buffer control part 14 updates the corresponding information of the work control table 18, that is, the most recent time when the buffers 20 are used by the work processing part and the counter information (or counted value) indicating the number of times the buffers 20 are used by the work processing part, when acquiring the buffers 20 of the buffer pools 19.

Based on the information which is related to the most recent time, and the counter information with respect to each work processing part, which are both stored in the work control table 18, the supervision control part 17 selects as the work processing part having the low priority the work processing part which has the most recent time that is old or the counted value which is small.

Figure 3:
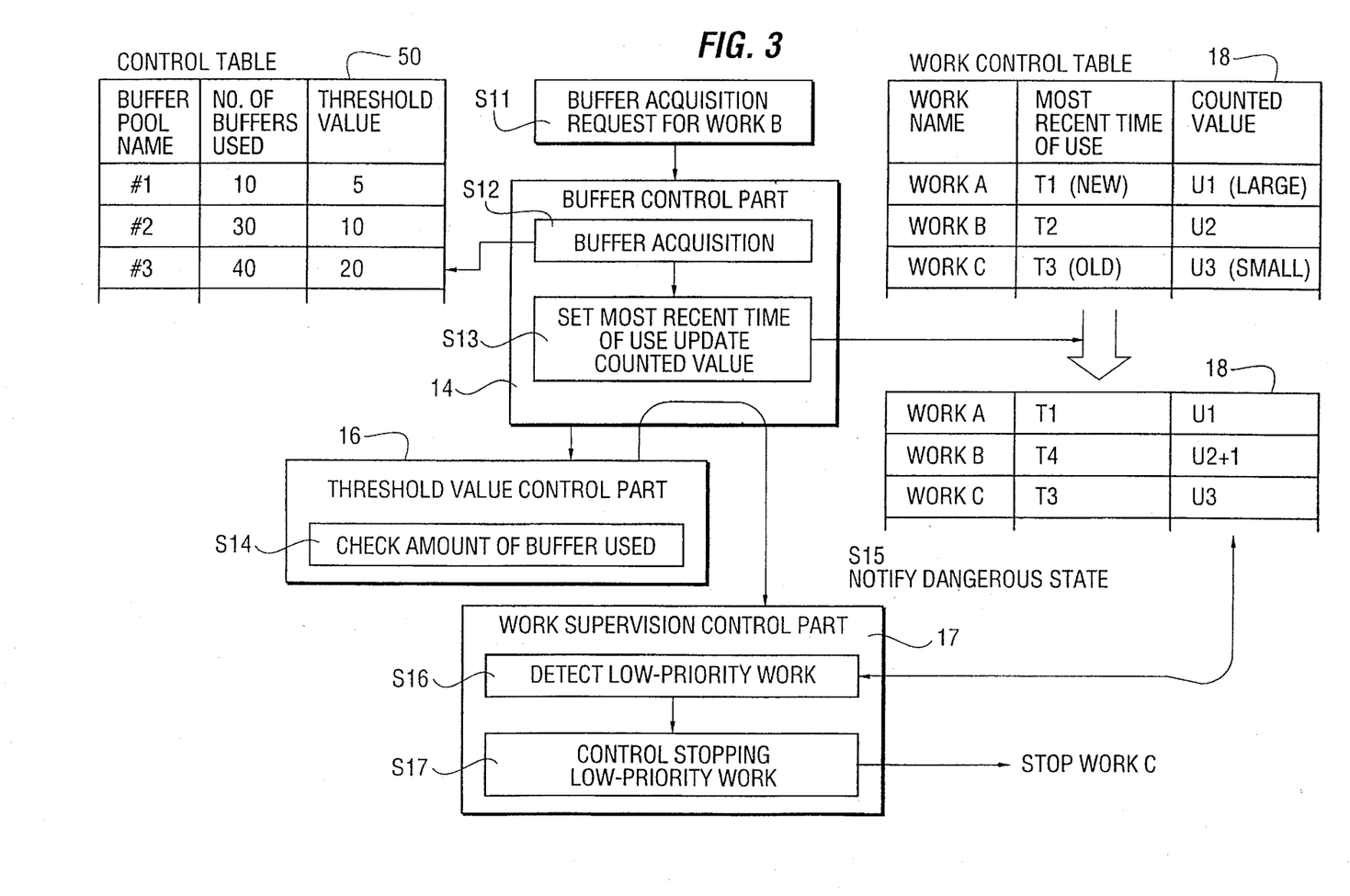
FIG. 3 is a diagram for explaining the general operation of the embodiment shown in FIG. 2.

FIG. 3 is a diagram for explaining the general operation of this embodiment. As shown on the right side of FIG. 3, the work control table 18 has fields corresponding to the work name, the most recent time of use of the buffers 20 by the work processing part, and the counter information (or counted value) related to the number of times tile buffers 20 are used by the work processing part. In this particular case, the most recent time of use of the buffers 20 by a work processing part having a work name A (hereinafter simply referred to as a work A) is T1, and the counted value related to the number of times the buffers 20 are used by the work A is U1. Similarly, the most recent time of use of the buffers 20 by a work B is T2, the counted value related to the number of times the buffers 20 are used by the work B is U2, the most recent time of use of the buffers 20 by a work C is T3, and the counted value related to the number of times the buffers 20 are used by the work C is U3.

For example, it will be assumed for the sake of convenience that a buffer acquisition request is made with respect to the buffer control part 14 in a step S11 shown in FIG. 3 in order to acquire the buffers 20 for the work B, so as to notify the message with respect to this work B.

In this case, the buffer control part 14 acquires the requested buffers 20 from a predetermined buffer pool 19 in a step S12. For example, each buffer pool 19 has a length corresponding to the buffer length which is the acquisition unit with which the buffers 20 are acquired in other words, one of the buffers 20 is acquired from the buffer pool 19 having the length which is in accordance with the requested buffer length. In addition, management information which indicates the state of use of the buffers 20 is also updated in a control table 50 which is related each buffer pool 19.

For example, the control table 50 includes the number of buffers 20 used and the predetermined threshold value for each of the buffer pools 19. For the sake of convenience, the buffer pools 19 are indicated as #1, #2, #3, . . . in FIG. 3.

Then, the buffer control part 14 updates the most recent time T2 of use related to the work B in the work control table 18 to a present time T4 in a step S13, shown in the central right part of FIG. 3. In addition, the step S13 increments the counted value U2 of the counter which counts the number of times the buffers 20 are used by the work B, also as shown in FIG. 3.

Next, the threshold value control part 16 receives a buffer acquisition notification from the buffer control part 14, and checks the amount of buffers 20 used and the like at this point in time in a step S14 by referring to the control table 50 which is related to tile buffer pools 19. If the checked rate or amount of buffers 20 used exceeds the predetermined threshold value, the threshold value control part 16 notifies the buffer control part 14 of the dangerous state where the buffer overload may occur. Of course, the comparison with the predetermined threshold value may be carried out with respect to the remaining amount of free or available buffers 20 instead of the amount of buffers 20 used.

When the buffer control part 14 receives the notification from the threshold value control part 16 indicating tile dangerous state of the buffers 20, the buffer control part 14 activates the work supervision control part 17 in a step S15.

The work supervision control part 17 refers to the work control table 18 and detects the work having the low priority in a step S16. For example, the work C is detected as having the low priority. The work having the low priority is detected by comparing the most recent time of use and the counter information of each of tile work A, the work B, the work C, . . . and regarding the work having the most recent time of use which is old or the work having the counted value which is small.

Then, the work supervision control part 17 sends a stop instruction with respect to the work C in a step S17 so as to prevent the work C from acquiring a new buffer 20 and to suppress the overload related to the buffers 20 used. As a result, it is possible to prevent the storage regions provided by the buffers 20 from becoming insufficient when a work having a high priority is to acquire the buffers 20.

In this specification, the work or work process having a high priority means that this work or work process is desirably carried out with priority over other work or work processes. On the other hand, the work or work process having a low priority means that this work or work process does not need to be carried out with priority over other work or work processes. In other words, the work or work process having the high priority is important relative to the work or work process having the low priority, and it is essential that the work or work process having the high priority is carried out with priority over other work or work processes. It may be regarded that the priority of the work or work process is high or low if the priority is greater than or less than a predetermined priority value.

Next, a description will be given of the operation of the buffer control part 14 of this embodiment, by referring to FIG. 4.

Figure 4:
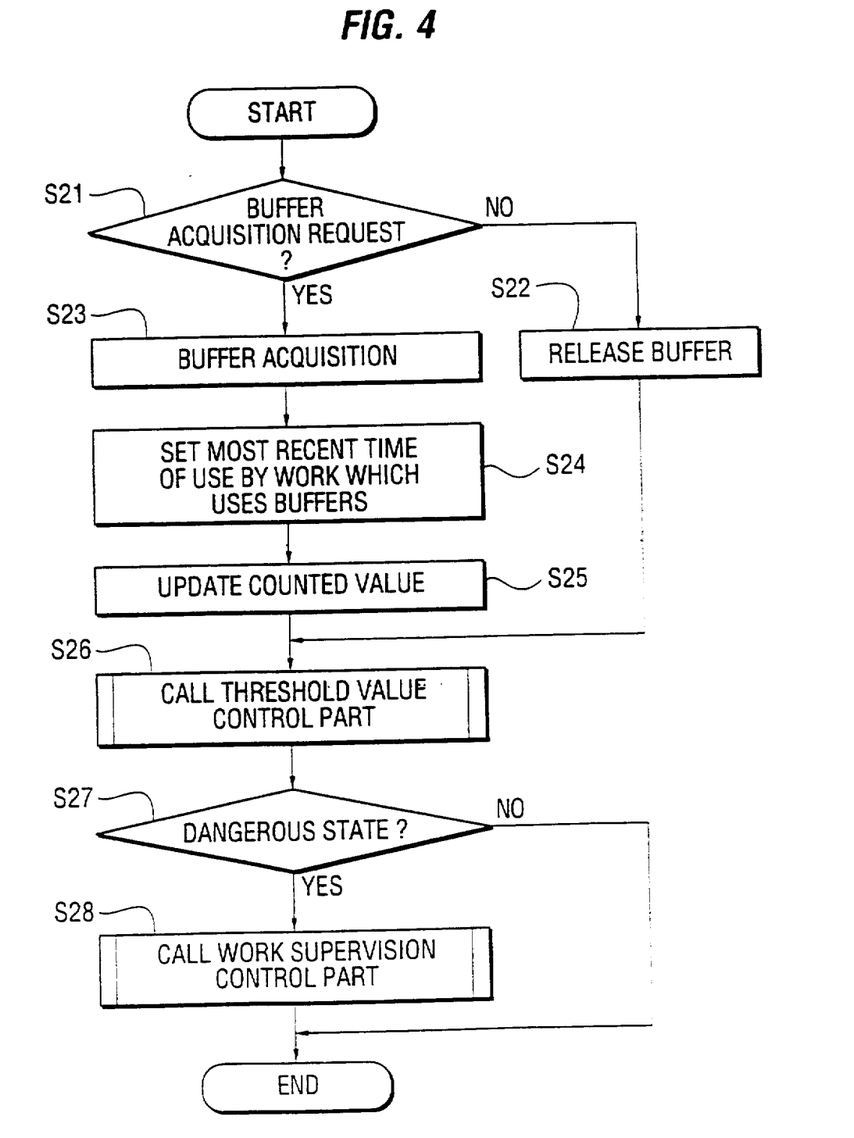
FIG. 4 is a flow chart for explaining the operation of a buffer control part shown in FIG. 2.

In FIG. 4, a step S21 decides whether or not the request is a buffer acquisition request. If the request is a buffer return request and the decision result in the step S21 is NO, a step S22 updates the control table 50 for managing the buffer pools 19 and each released buffer 20 is regarded as a free buffer 20. The process advances to a step S26 after the step S22.

On the other hand, if the request is a buffer acquisition request and the decision result in the step S21 is YES, a step S23 acquires the buffer 20. Then, a step S24 retrieves the work control table 18 by the work name of the work which uses the buffer 20, and sets the present time as the most recent time of use for the work. In addition, a step S25 increments the counted value of the counter which counts the number of times the buffer 20 is used by the work.

The step S26 calls the threshold value control part 16 and notifies the acquisition or release of the buffer 20. Then, a step S27 decides whether or not the buffers 20 are in the dangerous state depending on a judgement based a return code which is received from the threshold value control part 16. The process ends if the decision result in the step S27 is NO. On the other hand, if the decision result in the step S27 is YES, a step S28 calls the work supervision control part 17, and the process ends.

Next, a description will be given of the operation of the threshold value control part 16 of this embodiment, by referring to FIG. 5.

Figure 5:
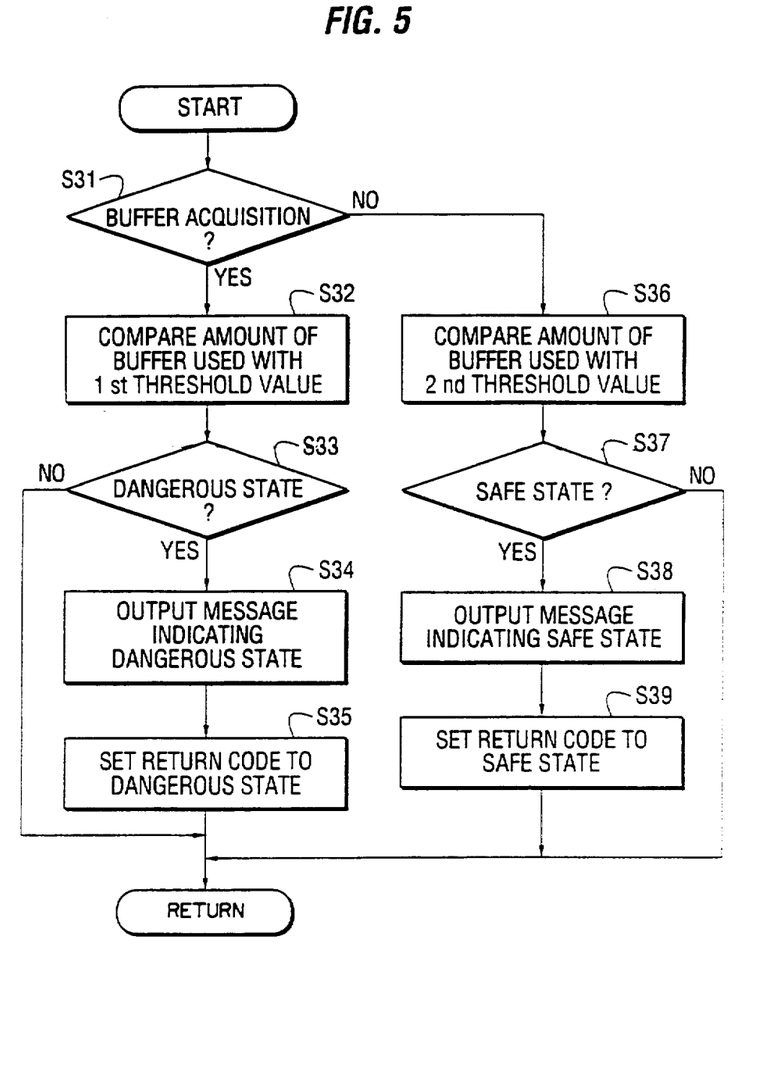
FIG. 5 is a flow chart for explaining the operation of a threshold value control part shown in FIG. 2.

In FIG. 5, a step S31 decides whether or not the buffer acquisition is made based on the notification from the buffer control part 14. In other words, the decision of the step S31 is made depending on whether the buffer acquisition notification or the buffer release notification is received from the buffer control part 14. If the buffer release notification is received and the decision result in the step S31 is NO, the process advances to a step S36 which will be described later.

On the other hand, if the buffer acquisition notification is received and the decision result in the step S31 is YES, a step S32 compares the present amount (or rate) of buffers 20 used with a first predetermined threshold value which is set for the purpose of judging the dangerous state of the buffers 20. A step S33 decides whether or not the present amount of buffers 20 used exceeds the first predetermined threshold value. The process ends if the decision result in the step S33 is NO. But if the decision result in the step S33 is YES, a step S34 outputs to the center console 21 a message which indicates the dangerous state of the buffers 20, so as to warn the operator that the storage regions provided by the buffers 20 may be insufficient. Then, a step S35 sets the return code indicating the dangerous state of the buffers 20, and the process ends so as to return the operation to the buffer control part 14 which called the threshold value control part 16.

But if the decision result in the step S31 is NO, the step S36 compares the present amount (or rate) of buffers 20 used with a second predetermined threshold value which set for the purpose of judging the safe state of the buffers 20. This second predetermined threshold value is set slightly smaller than the first predetermined threshold value. A step S37 decides whether or not the present amount of buffers 20 used is smaller than the second predetermined threshold value. The process ends if the decision result in the step S37 is NO. But if the decision result in the step S37 is YES, a step S38 outputs to the center console 21 a message which indicates that the dangerous state of the buffers 20 is avoided, so as to inform the operator of the safe state of the buffers 20. Then, a step S39 sets the return code indicating the safe state of the buffers 20, and the process ends so as to return the operation to the buffer control part 14 which called the threshold value control part 16.

Figure 6:
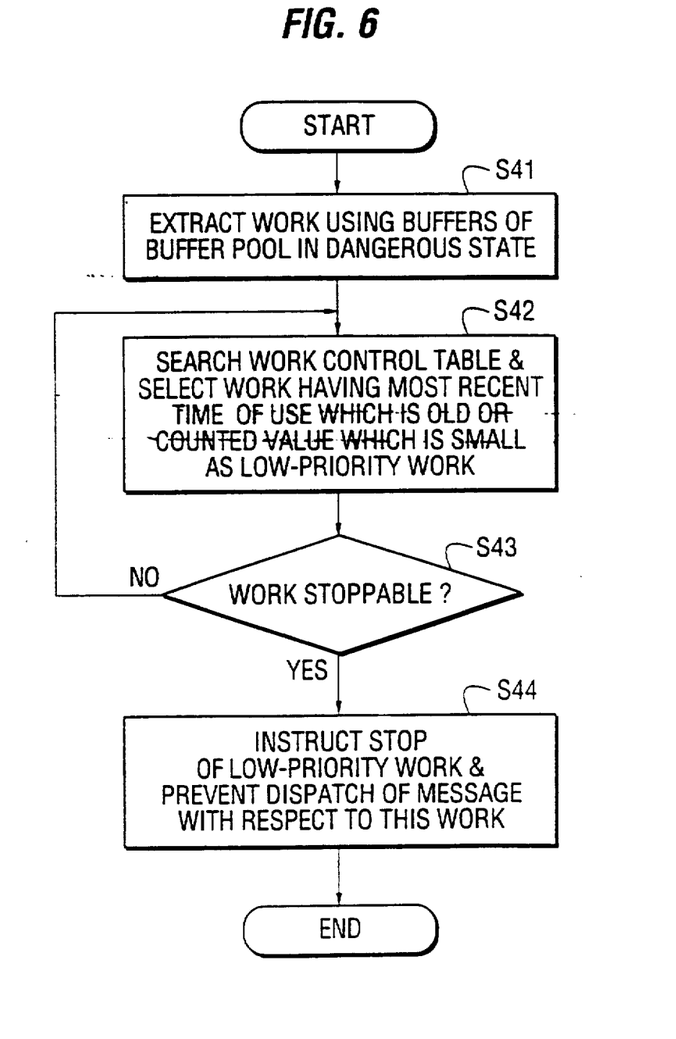
FIG. 6 is a flow chart for explaining the operation of a work supervision control part shown in FIG. 2.

Next, a description be given of the operation of the work supervision control part 17, by referring to FIG. 6.

In FIG. 6, a step S41 extracts the work processes which are presently using the buffers 20 of the buffer pools 19 based on the work control table 18 or other control tables (not shown), in response to the notification which is received from the buffer control part 14 and indicates the dangerous state of the buffers 20. Then, a step S42 searches the work control table 18 and selects from the work processes extracted in the step S41 a work process which has the most recent time of use that is old or the counted value that is small as the work process which has the low priority.

Thereafter, a step S43 decides whether or not the selected work process having the low priority can be stopped. The process returns to the step S42 so as to select another work process which has the low priority if the decision result in the step S43 is NO. Whether or not the work process can be stopped is set as the attribute of the work process in advance when starting the work process. If a work process cannot be stopped, measures are taken so as not to forcibly stop such a work process.

On the other hand, if the decision result in the step S43 is YES, a step S44 instructs the work process having the low priority to stop, and prevents dispatch of tile message with respect to this work process. The process ends after the step S44.

When it is detected by the process of the threshold value control part 16 that the state of the buffers 20 has returned to the safe state from the dangerous state, the processing of the work process which was stopped is resumed by an instruction from the work supervision control part 17 or by an instruction from the operator.

The step S42 shown in FIG. 6 may select the work having the low priority in the following manner, for example.

First, the work control table 18 is searched so as to select an arbitrary number of work processes having most recent times of use which are old as candidates of the work processes having the low priority. Then, out of these selected work processes, the work process having the smallest counted value, that is, the smallest frequency of use, is selected as the work process having the low priority.

Second, a function F for obtaining a low-priority value V is defined by the following formula, for example, where T denotes the most recent time of use of each work process, U denotes the counted value, and a and b are predetermined coefficients.

$V = F(T, U)$
$= a[(\text{Present Time}) - T] + [(\text{Maximum Counted Value}) - U]$ The function F is used to calculate the low-priority value V for each work process. The work process having a large low-priority value V is selected as the work process having the low priority.

Figure 7A:
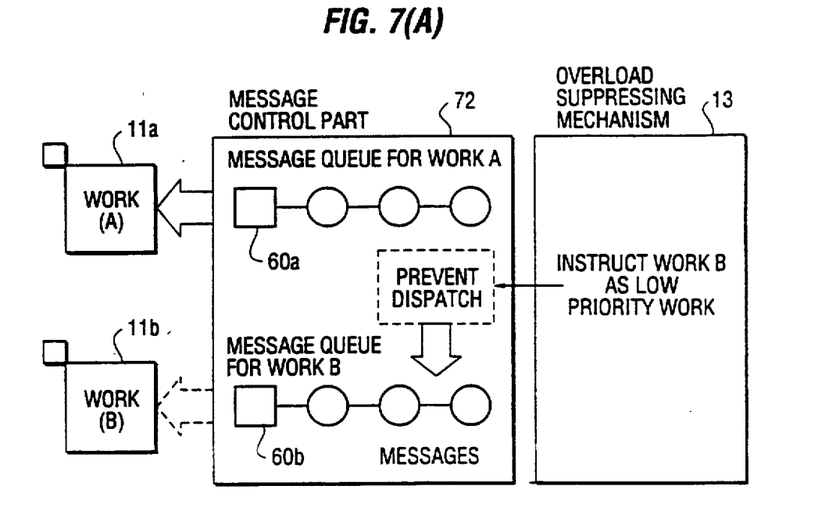
FIGS. 7(A) and 7(B) are system block diagram for explaining an application of the present invention.
Figure 7B:
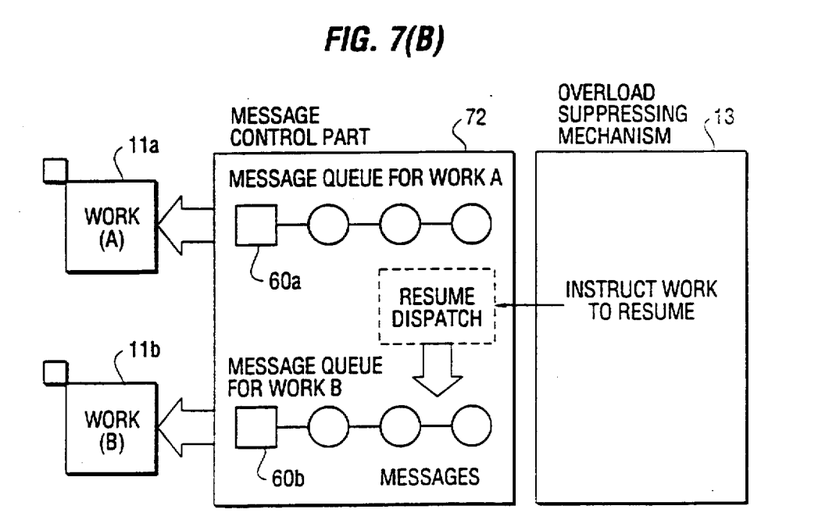

Next, a description will be given of an application of the present invention, by referring to FIG. 7. In FIG. 7, those parts which are the same as those corresponding parts in FIG. 2 are designated by the same reference numerals, and a description thereof will be omitted.

In a transaction process of the on-line processing system, a message control part 72 dispatches to specified destinations messages which are issued from the work station, the application program or the like. For this reason, message queues 60a, 60b, . . . are provided with respect to the messages which are dispatched for each destination. The buffers 20 which are acquired from the buffer pools 19 are used as storage regions for temporarily storing the messages which are dispatched.

As the load on the buffers 20 increases when carrying out the above described message control, an instruction is output to stop the work B with the low priority, for example, if the overload suppressing mechanism 13 detects the work B having the low priority as shown in FIG. 7 (A). The message control part 72 prevents the dispatch of the message with respect to the work B which is notified as having the low priority, and temporarily holds the work B.

On the other hand, if the load on the buffers 20 stabilizes and the overload suppressing mechanism 13 detects that the rate of use of the buffers 20 has reached the safe state from the dangerous state, the message control part 72 releases the work B in response to the notification indicating the safe state of the buffer 20, and resumes the dispatch of the messages with respect to the work B, as shown in FIG. 7 (B).

Further, the present invention is not limited to these embodiments, but various variations and modifications may be made without departing from the scope of the present invention.

What is claimed is:

1. An on-line processing system capable of automatically suppressing overloads of buffer regions, the on-line processing system comprising:

a plurality of work processing means for carrying out work processes based on application programs;

a plurality of buffer pools having the buffer regions;

buffer control means, coupled to said work processing means and said buffer pools, for allocating the buffer regions of said buffer pools for use by each of said work processing means;

threshold value control means, coupled to said buffer control means, for detecting a dangerous state of the buffer regions when said buffer control means acquires the buffer regions from said buffer pools by comparing predetermined information related to an amount of buffer regions used and a predetermined threshold value, said dangerous state indicating a possibility of a buffer overload due to lack of storage regions provided by the buffer regions;

work supervision control means, coupled to said buffer control means, for automatically detecting a work processing means having a priority which is lower than a predetermined priority value out of said plurality of work processing means, and for suppressing said detected work processing means, so that the overload of the buffer regions is avoided; and a work control table storing first information and second information related to each of said plurality of work processing means, said first information indicating a most recent time of use of each buffer region by each work processing means, said second information indicating a number of times each buffer region is used by each work processing means, said buffer control means allocating the buffer regions of said buffer pools for use by each of said work processing parts based on said work control table.

2. The on-line processing system as claimed in claim 1, wherein said buffer control means includes update means for updating the first and second information of said work control table related to an arbitrary work processing means which uses the buffer regions when said buffer control means acquires the buffer regions for use by said arbitrary work processing means.

3. The on-line processing system as claimed in claim 2, wherein said work supervision control means includes processing means for automatically detecting the work processing means having the priority which is lower than the predetermined priority value out of said plurality of work processing means based on said work control table.

4. An overload suppressing method adapted to an on-line processing system which is capable of automatically suppressing overloads of buffer regions and which comprises a plurality of work processing means for carrying out work processes based on application programs, a plurality of buffer pools having the buffer regions, and buffer control means, coupled to said work processing means and said buffer pools, for allocating the buffer regions of said buffer pools for use by each of said work processing means said overload suppressing method comprising the steps of:

(a) detecting a dangerous state of the buffer regions when the buffer control means acquires the buffer regions from the buffer pools by comparing predetermined information related to an amount of buffer regions used and a predetermined threshold value, said dangerous state indicating a possibility of a buffer overload due to lack of storage regions provided by the buffer regions;

(b) automatically detecting a work processing means having a priority which is lower than a predetermined priority value out of the plurality of work processing means, and for suppressing said detected work processing means, so that the overload of the buffer regions is avoided; and (c) storing first information and second information related to each of the plurality of work processing means in a work control table, said first information indicating a most recent time of use of each buffer region by each work processing means, said second information indicating a number of times each buffer region is used by each work processing means, said step (a) allocating the buffer regions of the buffer pools for use by each of the work processing parts based on the work control table obtained in said step (c).

5. The overload suppressing method as claimed in claim 4, wherein said step (a) includes updating the first and second information of the work control table related to an arbitrary work processing means which uses the buffer regions when said step (a) acquires the buffer regions for use by said arbitrary work processing means.

6. The overload suppressing method as claimed in claim 5, wherein said step (b) includes automatically detecting the work processing means having the priority which is lower than the predetermined priority value out of the plurality of work processing means based on the work control table obtained by said step (c).

* * * * *

UNITED STATES PATENT AND TRADEMARK OFFICE
CERTIFICATE OF CORRECTION

PATENT NO. : 5,511,214

DATED : April 23, 1996

INVENTOR(S) : Yutaka YAMADA

It is certified that error appears in the above-indentified patent and that said Letters Patent is hereby corrected as shown below:

Title Page, Col. 2, change "6 Claims, 3 Drawing Sheets" to --6 Claims, 7 Drawing Sheets--.

Figs. 4, 5, 6, 7A and 7B are missing from printed patent. Please insert the attached four sheets of drawings behind sheet 3.

Col. 1, lines 37, change "tile" to --the--.

Col. 4, line 59, insert --,-- after "information".

Col. 5, line 4, change "tile" to --the--;
Col. 5, line 25, change "in" to --. In--;
Col. 5, line 56, change "tile" to --the--;
Col. 5, line 64, change "tile" to --the--.

Col. 7, line 51, change "tile" to --the--.

Col. 9, line 39, insert --,-- after "means".

Signed and Sealed this

Ninth Day of July, 1996

Attest:

BRUCE LEHMAN

*Attesting Officer*     *Commissioner of Patents and Trademarks*